(12) United States Patent
Sang et al.

(10) Patent No.: US 10,869,168 B2
(45) Date of Patent: Dec. 15, 2020

(54) METHOD, DEVICE, AND STORAGE MEDIUM FOR DATA TRANSMISSION

(71) Applicant: ZTE Corporation, Guangdong (CN)

(72) Inventors: Jian Sang, Shenzhen (CN); Zijiang Ma, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 492 days.

(21) Appl. No.: 15/514,015

(22) PCT Filed: Dec. 26, 2014

(86) PCT No.: PCT/CN2014/095194
§ 371 (c)(1),
(2) Date: Mar. 24, 2017

(87) PCT Pub. No.: WO2015/131638
PCT Pub. Date: Sep. 11, 2015

(65) Prior Publication Data
US 2017/0280303 A1     Sep. 28, 2017

(30) Foreign Application Priority Data
Sep. 29, 2014 (CN) .......................... 2014 1 0514103

(51) Int. Cl.
*H04W 4/06* (2009.01)
*H04W 72/00* (2009.01)
*H04L 12/18* (2006.01)

(52) U.S. Cl.
CPC ........... *H04W 4/06* (2013.01); *H04W 72/005* (2013.01); *H04L 12/189* (2013.01)

(58) Field of Classification Search
CPC ...... H04W 4/06; H04W 72/005; H04L 12/189
(Continued)

(56) References Cited

U.S. PATENT DOCUMENTS

2005/0007990 A1   1/2005 Beckmann
2011/0243056 A1*  10/2011 Jen ................. H04L 5/0007
                                                      370/312
(Continued)

FOREIGN PATENT DOCUMENTS

CN   101888591 A   11/2010
CN   102264033 A   11/2011
(Continued)

OTHER PUBLICATIONS

"Correction on MCH transmission", Oct. 2014, 3GPP TSG-RAN WG3 Meeting #85bis R3-142330, Huawei, 2 pgs.
(Continued)

*Primary Examiner* — Chi Tang P Cheng
(74) *Attorney, Agent, or Firm* — Li & Cai Intellectual Property (USA) Office (57) ABSTRACT

The disclosure discloses a data transmission method, wherein the method includes that: a base station (eNB) transmits a system information block message upon confirming that a Physical Multicast Channel (PMCH) carrying a Multicast Control Channel (MCCH) is not present; configures a Multimedia Broadcast Multicast Service Single Frequency Network (MBSFN) area configuration message according to the system information block message; performs data scheduling according to the configuration of the system information block message or of the MBSFN area configuration message; and transmits the MBSFN area configuration message. The disclosure further discloses two other data transmission methods, a base station, user equipment, a multicell-multicast coordination entity, and a storage medium at the same time.

17 Claims, 6 Drawing Sheets

(58) Field of Classification Search
USPC .......................................................... 370/312
See application file for complete search history.

(56) References Cited

U.S. PATENT DOCUMENTS

| | | | | |
|---|---|---|---|---|
| 2012/0287838 | A1* | 11/2012 | Zhang | H04W 76/40 |
| | | | | 370/312 |
| 2013/0051306 | A1 | 2/2013 | Gou | |
| 2014/0036755 | A1* | 2/2014 | Lee | H04W 36/26 |
| | | | | 370/312 |
| 2015/0146604 | A1* | 5/2015 | Kim | H04W 4/06 |
| | | | | 370/312 |
| 2016/0338011 | A1* | 11/2016 | Mizusawa | H04W 4/06 |
| 2017/0180952 | A1* | 6/2017 | Kim | H04W 72/121 |

FOREIGN PATENT DOCUMENTS

| | | |
|---|---|---|
| CN | 103888956 A | 6/2014 |
| JP | 5310598 B2 | 10/2013 |
| WO | 03055256 A1 | 7/2003 |
| WO | 2014119847 A1 | 8/2014 |

OTHER PUBLICATIONS

"3rd Generation Partnership Project; Technical Specification Group Radio Access Network; Evolved Universal Terrestrial Radio Access Network (E-UTRAN); M2 Application Protocol (M2AP), (Release 11)", Jun. 2013, 3rd Generation Partnership Project, Mobile Competence Centre,650, Sophia-Antipolis Cedex, France, Retrieved from the Internet: URL:http://www.3gpp.org/ftp/Specs/zltuInfo/M.2012-2/2014-12/ Rel-11/36_ series/, 84 pgs.

"3rd Generation Partnership Project; Technical Specification Group Radio Access Network; Evolved Universal Terrestrial Radio Access (E-UTRA); Radio Resource Control (RRC); Protocol specification (Release 11)", Sep. 2014, 3rd Generation Partnership Project, Mobile Competence Centre,650, Sophia-Antipolis Cedex, FranceMobile Competence Centre,650, Sophia-Antipolis Cedex, France, Retrieved from the Internet:URL:http://www.3gpp.org/ftp/tsg_ran/WG2_RL2/Specifications/ 201409_draft_specs_after_RAN_65/, 276 pgs.

Supplementary European Search Report in European application No. 14885021.7, dated Sep. 5, 2017, 9 pgs.

International Search Report in international application No. PCT/CN2014/095194, dated Jul. 1, 2015, 2 pgs.

* cited by examiner

METHOD, DEVICE, AND STORAGE MEDIUM FOR DATA TRANSMISSION

TECHNICAL FIELD

The disclosure relates to relates to signal processing technique in mobile communication, and in particularly to a method, device, and storage medium for data transmission.

BACKGROUND

With the development of mobile Internet and large-screen mobile terminals, more and more mobile terminal users choose to carry out multimedia information service processing on the mobile terminal side, such as video conference, live event, online education and so on. Compared with ordinary data services, the multimedia information service has the characteristics such as a high bandwidth, a long duration, sensitive time delay requirement, relatively fixed transmission content and so on. In order to make effective use of spectrum resources, the 3rd Generation Partnership Project (3GPP) organization has proposed Multimedia Broadcast Multicast Service (MBMS), which is a kind of point-to-multipoint service. That is, there is one data source, and there are multiple targets to receive data. MBMS service can realize the sharing of network resources, and improve the utilization rate of frequency domain resources in a wireless access network.

In the Long Term Evolution (LTE) system, the MBMS service is called evolved-Multimedia Broadcast Multicast Service (eMBMS).

In the eMBMS service, according to the 3GPP TS36300 protocol specification, a Multicast Control Channel (MCCH) and a Multicast Transmission Channel (MTCH) on the evolved NodeB (eNB) side are multiplexed at a Multicast Channel (MCH), and the MCH is mapped on a Physical Multicast Channel (PMCH), so that the MCCH and MTCH are multiplexed on the PMCH. When the PMCH carrying the MCCH is not present on the eNB side, the data transmission of the PMCH is stopped on the eNB side, so that the data of the MCCH cannot be transmitted.

SUMMARY

In view of this, the embodiments of the disclosure are intended to provide a method, a device, and a storage medium for data transmission, which can normally transmit the data of the MCCH when the PMCH carrying the MCCH is not present on the eNB side.

The technical solutions of the embodiments of the disclosure are implemented as follows.

One embodiment of the disclosure provides a data transmission method, the method including that: the eNB transmits a system information block message upon confirming that a PMCH carrying a MCCH is not present; configures a Multimedia Broadcast Multicast Service Single Frequency Network (MBSFN) area configuration message according to the system information block message; performs data scheduling according to the configuration of the system information block message or the configuration of the MBSFN area configuration message; and transmits the MBSFN area configuration message.

In one embodiment, confirming that the PMCH carrying the MCCH is not present includes that: the eNB receives an M2 setup response message, and confirming that the PMCH carrying the MCCH is not present when the MBMS scheduling information indication message is not received; or the eNB receives an MBMS scheduling information indication message, and confirms that the PMCH carrying the MCCH is not present according to the MBMS scheduling information indication message.

In one embodiment, before transmitting the system information block message, the method further includes that: the eNB receives a Multi-Cell/Multicast Coordination Entity (MCE) configuration update message; and correspondingly, transmitting the system information block message includes: transmitting a system information block message through an air interface; wherein the content of the system information block message is configured according to one of the M2 setup request response message, the eNB configuration update acknowledge message, and the MCE configuration update message, the message time of which is newer.

The embodiment of the disclosure also provides a data transmission method, the method including that: user equipment (UE) receives a system information block message and an MBSFN area configuration message;

wherein the content of the MBSFN area configuration message is configured by the UE according to the system information block message, and the MBSFN area configuration message indicates that the number of PMCHs is N+1, wherein one PMCH carries the MCCH, and the number of MBMS sessions contained in the PMCH carrying the MCCH is 0.

The embodiment of the disclosure also provides a data transmission method, the method including that: the MCE transmits a message indicating that the PMCH carrying the MCCH is not present; and receives a response message of the message.

In one embodiment, the message indicating that the PMCH carrying the MCCH is not present is: the MBMS scheduling information indication message; and correspondingly, the response message of the message is: the MBMS scheduling information indication response message.

In one embodiment, before the MCE transmits message indicating that the PMCH carrying the MCCH is not present, the method further includes that: the MCE receives an M2 setup request message, and transmits an M2 setup request response message; the MCE receives an eNB configuration update message, and transmits an eNB configuration update acknowledge message; the MCE transmits an MCE configuration update message, and receives an MCE configuration update acknowledge message.

The embodiment of the disclosure also provides an eNB, the eNB including: a confirming module, a first transmitting module, a configuring module, a processing module and a second transmitting module; wherein the confirming module is configured to confirm whether a PMCH carrying an MCCH is present;

the first transmitting module is configured to transmit a system information block message when the confirming module confirms that the PMCH carrying the MCCH is not present;

the configuring module is configured to configure an MBSFN area configuration message according to the system information block message;

the processing module is configured to perform data scheduling according to the configuration of the system information block message or a configuration of an MBSFN area configuration message; and the second transmitting module is configured to transmit the MBSFN area configuration message.

In one embodiment, the eNB further includes a first receiving module, wherein when the confirming module confirms that the PMCH carrying the MCCH is not present, the first receiving module is configured to receive an M2 setup request response message; or the first receiving module is further configured to receive an MBMS scheduling information indication message indicating that the PMCH carrying the MCCH is not present.

In one embodiment, the first receiving module is further configured to receive an MCE configuration update message; correspondingly, the first transmitting module is configured to transmit a system information block message through an air interface; wherein the content of the system information block message is configured according to one of the M2 setup request response message, the eNB configuration update acknowledge message, and the MCE configuration update message, the message time of which is newer.

The embodiment of the disclosure also provides a UE, the UE including: a second receiving module and a third receiving module; wherein the second receiving module is configured to receive a system information block message;

the third receiving module is configured to receive an MBSFN area configuration message; and the content of the MBSFN area configuration message is configured by the UE according to the system information block message, and the MBSFN area configuration message indicates that the number of PMCHs is N+1, wherein one PMCH carries the MCCH, and the number of MBMS sessions contained in the PMCH carrying the MCCH is 0.

The embodiment of the disclosure also provides a MCE, the MCE including: a third transmitting module and a fourth receiving module, wherein the third transmitting module is configured to transmit a message indicating that the PMCH carrying the MCCH is not present; and the fourth receiving module is configured to receive a response message of the message.

In one embodiment, the message indicating that the PMCH carrying the MCCH is not present is: the MBMS scheduling information indication message; and correspondingly, the response message of the message is: the MBMS scheduling information indication response message.

In one embodiment, the MCE further includes: a fourth transmitting module and a fifth receiving module; wherein the fourth transmitting module is configured to transmit an M2 setup request response message; the fifth receiving module is configured to receive an M2 setup request message; or the fourth transmitting module is configured to transmit an eNB configuration update acknowledge message; the fifth receiving module is configured to receive an eNB configuration update message; or the fourth transmitting module is configured to transmit an MCE configuration update message; and the fifth receiving module is configured to receive an MCE configuration update acknowledge message.

The embodiment of the disclosure also provides a computer storage medium, in which computer-executable indications are stored, which are used for executing the above data transmission method in the embodiment of the disclosure.

The embodiment of the disclosure provides a data transmission method, a device, and a storage medium, in which the MCE transmits, to the eNB, the message indicating that the PMCH carrying the MCCH is not present; the eNB transmits, to the MCE, a response message of the message upon confirming that the PMCH carrying the MCCH is not present, and transmits a system information block message to the UE; the UE receives the system information block message; the eNB configures the MBSFN area configuration message according to the system information block message, performs the data scheduling according to the configuration of the system information block message or the MBSFN area configuration message, and transmits the MBSFN area configuration message to the UE. In the embodiment of the disclosure, upon the eNB confirms that the PMCH carrying the MCCH is not present, an MCCH default transmission mechanism is used, that is, transmitting the system information block message and the MBSFN area configuration message to the UE. The MBSFN area configuration message indicates that the number of PMCHs is N+1, wherein the first to the Nth PMCHs do not carry MCCH, and the number of MBMS sessions contained in the N+1th PMCH is 0, so that the MCCH data can be transmitted normally when the PMCH carrying the MCCH is not present.

DETAILED DESCRIPTION

In the embodiment of the disclosure, the MCE transmits, to the eNB, a message indicating that the PMCH carrying the MCCH is not present. The eNB transmits, to the MCE, a response message of the message upon confirming that the PMCH carrying the MCCH is not present, and transmits a system information block message to the UE. The UE receives the system information block message. The eNB configures the MBSFN area configuration message according to the system information block message, performs the data scheduling according to the configuration of the system information block message or the MBSFN area configuration message, and transmits the MBSFN area configuration message to the UE.

Figure 1:
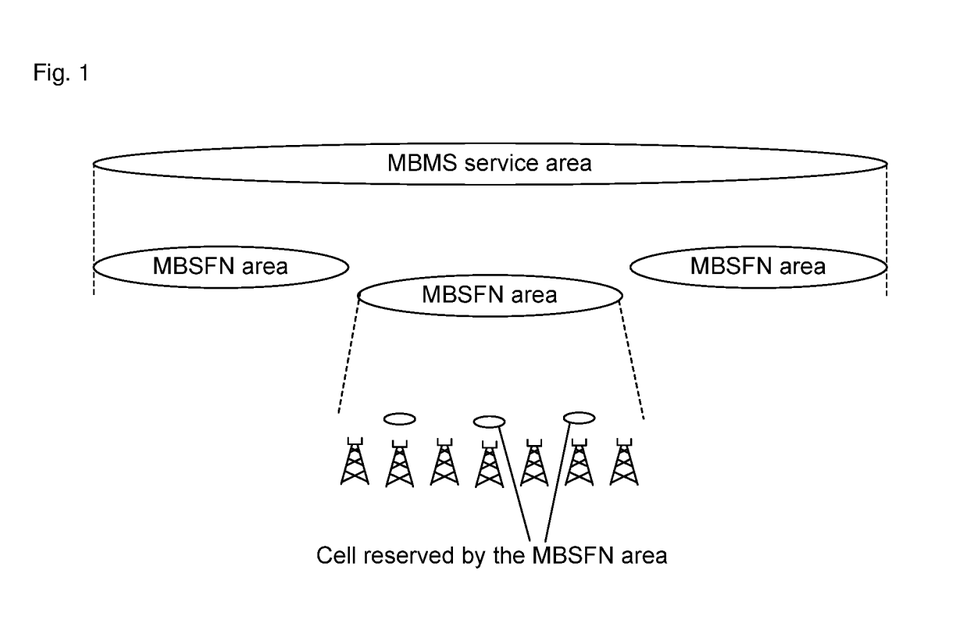
FIG. 1 is a deployment schematic diagram of the service area, synchronization area and MBSFN area of the LTE eMBMS service.
Figure 2:
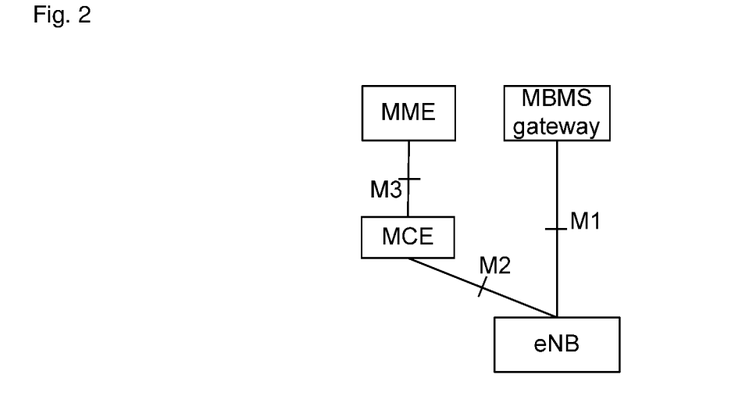
FIG. 2 is a logical architecture diagram of the LTE eMBMS service.

For a better understanding of the technical solutions of the embodiments of the disclosure, the LTE eMBMS service is described in detail below. The deployment schematic diagram of the service area, synchronization area and MBSFN area of the LTE eMBMS service is as shown in FIG. 1. The logical architecture diagram of the LTE eMBMS service is as shown in FIG. 2. M1 is a user plane interface, M2 is the E-UTRAN internal controlling plane interface, and M3 is the E-UTRAN and EPC controlling plane interface. MBMS GW is the MBMS gateway. The MCE is responsible for the management of the MBMS session, including: the admission control of the MBMS session, the radio resource allocation in the time domain, the coordinated transmission of the MBMS data of each cell in the MBSFN area, and the wireless configuration of things like parameters of the modulation and coding manner of each channel, and the like.

In the LTE eMBMS service, there is an MCCH, and zero or more MTCHs in each MBSFN area, and MTCHs are multiplexed on the same or different MCHs. Each MTCH corresponds to an MBMS session.

In the LTE eMBMS service, the interface related to the control plane includes an M3 port and an M2 port. The M3 port is the interface between the Mobility Management Entity (MME) and the MCE, and the M2 port is the interface between the MCE and the eNB. The MCE communicates the relevant configuration parameters to the eNB through the M2 port. The eNB fills the System Information Block Type 2 message, the System Information Block Type 13 message, the MBSFN Area Configuration message, and schedules and transmits the MBMS data according to the received relevant parameters. The System Information Block Type 13 message indicates the MCCH-related configuration of the cell and the allocation information of the MBSFN subframe in which the MCCH is located. The MBSFN Area Configuration message indicates the specific contents of the MCCH, including the allocation information of the common subframe in the MBSFN area within the cell, the configuration information of the PMCH, the information of each MTCH, and the like.

In the LTE eMBMS service, since the PMCH carrying the MCCH is not present on the eNB side, the scene where the MCCH data cannot be transmitted includes: 1, before the eNB and the MCE complete the setup of the M2 port, and the eNB receives the MBMS SCHEDULING INFORMATION transmitted by the MCE; 2, when there is no MBMS session on the PMCH carrying the MCCH on the MCCH side or no MBMS session on the MCE side. The reason why the MCCH data cannot be transmitted due to the absence of the PMCH carrying the MCCH on the eNB side is as follows: according to the specification of 3GPP TS36443-b30 9.1.7, the MBMS SCHEDULING INFORMATION message transmitted through the M2 port does not support the case where the number of MBMS sessions on the PMCH is 0. Assuming that the MCCH is carried on a PMCH for transmission, but there is no MBMS session on the PMCH, the MCE notifies the eNB of this information. The PMCH needs to be carried in the MBMS SCHEDULING INFORMATION message and the number of MTCHs in the PMCH is zero. However, it conflicts with the stipulation that the minimum number of sessions contained in the MBMS SCHEDULING INFORMATION of the 3GPP TS36443-b30 protocol is 1. Therefore, the MBMS SCHEDULING INFORMATION message transmitted via the M2 port cannot carry the PMCH when there is no MTCH on the PMCH carrying the MCCH on the MCCH side.

Figure 3:
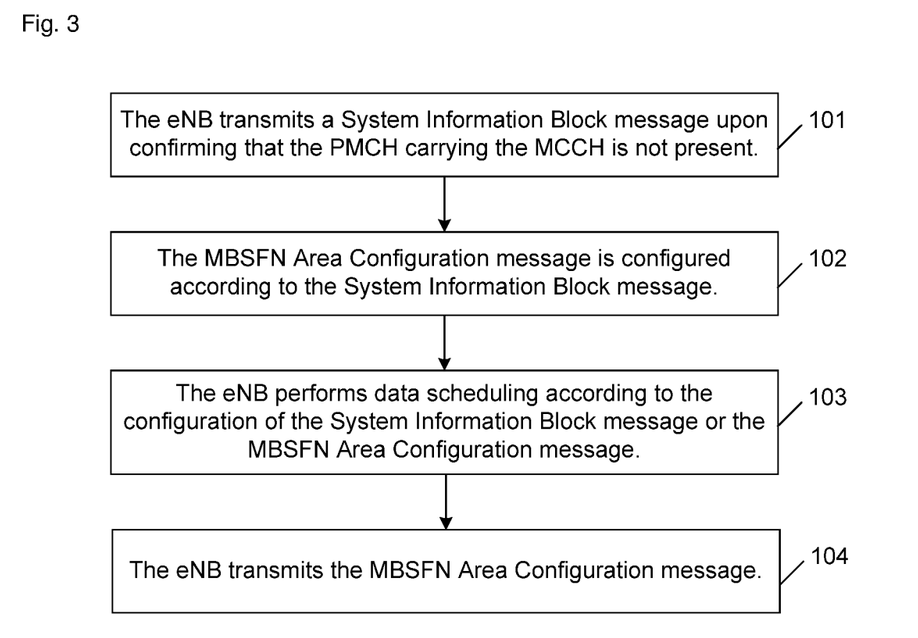
FIG. 3 is a schematic diagram of a basic processing flow of a data transmission method on the eNB side according to one embodiment of the disclosure.

The basic processing flow of a data transmission method on the eNB side according to one embodiment of the disclosure includes, as shown in FIG. 3, the following steps.

Step 101: The eNB transmits a System Information Block message upon confirming that the PMCH carrying the MCCH is not present.

That the PMCH carrying the MCCH is not present includes that the number of PMCHs is N, but the N PMCHs do not carry the MCCH, where N is an integer equal to or greater than zero.

Specifically, that the eNB confirms that the PMCH carrying the MCCH is not present includes that: the eNB receives the M2 SETUP RESPONSE message transmitted by the MCE, and confirms that the PMCH carrying the MCCH is not present when the MBMS scheduling information indication message is not received; or the eMS receives the MBMS SCHEDULING INFORMATION transmitted by the MCE Message, and the MBMS SCHEDULING INFORMATION message indicates that the PMCH carrying the MCCH is not present.

The eNB transmits a System Information Block message to the UE through the air interface, receives the M2 SETUP RESPONSE message transmitted by the MCE and confirms that the PMCH carrying the MCCH is not present when the MBMS scheduling information indication message is not received. The contents of the System Information Block message are configured according to the M2 SETUP RESPONSE message.

When the MBMS SCHEDULING INFORMATION message indicates that the PMCH carrying the MCCH is not present, the contents of the System Information Block message are configured according to the MCE CONFIGURATION UPDATE message.

According to the 3GPP TS36331 protocol specification, the UE will read the MCCH in each modification period of MCCH. To save the UE power consumption, the modification period of the MCCH in the System Information Block message is set as the maximum value allowed by the protocol on the eNB side. The MCE transmits, to the eNB, MCE CONFIGURATION UPDATE message for eNB to update MCCH modification period as the maximum value allowed by the protocol.

Here, the System Information Block message may be a System Information Block Type 13 message. The following embodiments of the disclosure use the System Information Block message as the System Information Block Type 13 message, as an example.

Step 102: The MBSFN Area Configuration message is configured according to the System Information Block message.

Here, the common subframe configuration information of the MBSFN area in the MBSFN Area Configuration message is set as follows, for example: commonSF-Alloc, and commonSF-AllocPeriod are the same as the System Information Block; the number of PMCHs in the MBSFN Area Configuration message is N+1. The configuration of the added PMCH is the same as the System Information Block message, and the added PMCH contains zero MBMS session.

According to the 3GPP TS36331 protocol specification, the scheduling period of the PMCH carrying the MCCH in the MBSFN Area Configuration message cannot be greater than the MCCH repetition period indicated in the System Information Block message. Therefore, in order to ensure that the message contents transmitted by the eNBs served by the same MCE are consistent, the scheduling period of the PMCH is set to the minimum value allowed by the protocol or the scheduling period of the PMCH is set to the same value as the MCCH repetition period indicated in the System Information Block message. Thus, the scheduling resources on the eNB side can be saved to the greatest extent.

Step 103: The eNB performs data scheduling according to the configuration of the System Information Block message or the MBSFN Area Configuration message.

Step 104: The eNB transmits the MBSFN Area Configuration message.

Figure 4:
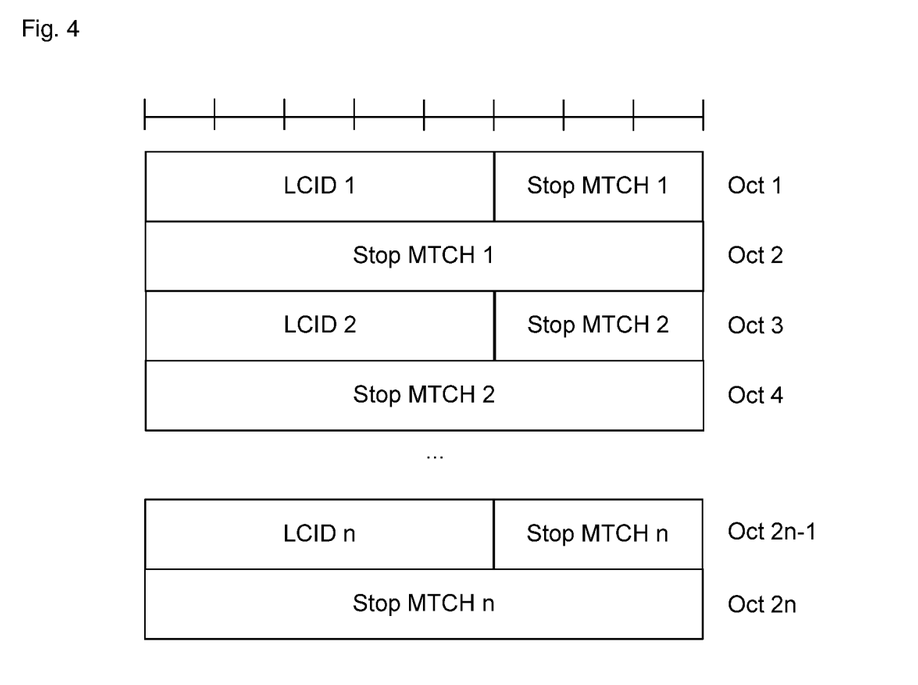
FIG. 4 is a structure schematic diagram of the scheduling indication information of the LTE eMBMS service.

Specifically, the eNB transmits the MBSFN Area Configuration message to the UE via an air interface, and the structure diagram of the scheduling indication information is shown in FIG. 4.

Figure 5:
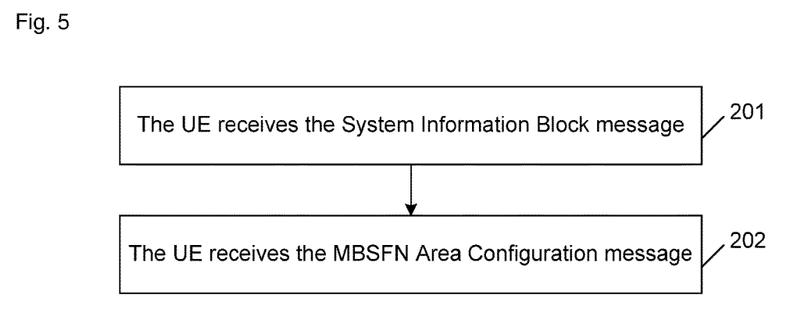
FIG. 5 is a schematic diagram of a basic processing flow of a data transmission method on the UE side according to one embodiment of the disclosure.

The detailed processing flow of a data transmission method on the UE side according to an embodiment of the disclosure includes, as shown in FIG. 5, the following steps.

Step 201: The UE receives the System Information Block message.

Specifically, the UE receives the System Information Block message transmitted by the eNB through the air interface.

The content of the System Information Block message is configured according to one of the M2 SETUP RESPONSE message, the eNB CONFIGURATION UPDATE ACKNOWLEDGE message and the MCE CONFIGURATION UPDATE message, the message time of which is newer. The modification period of the MCCH in the System Information Block message is the maximum value allowed by the 3GPP TS36331 protocol.

Here, the System Information Block message may be a System Information Block Type 13 message.

Step 202: The UE receives the MBSFN Area Configuration message.

Specifically, the UE receives the MBSFN Area Configuration message transmitted by the eNB through the air interface.

The common subframe configuration information of the MBSFN area in the MBSFN Area Configuration message is set as follows, for example: commonSF-Alloc, and commonSF-AllocPeriod are the same as the System Information Block Type 13; the number of PMCHs in the MBSFN Area Configuration message is N+1. One PMCH carries the MCCH. The configuration of the PMCH carrying the MCCH is the same as the System Information Block. The PMCH carrying the MCCH contains zero MBMS session. The scheduling period of the PMCH in the MBSFN Area Configuration message is the minimum value allowed by the 3GPP TS36331 protocol, or the scheduling period of the PMCH is the value which is the same as the MCCH repetition period indicated in the System Information Block message.

Figure 6:
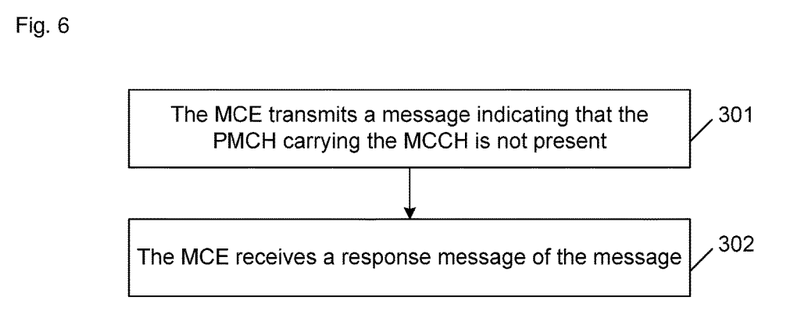
FIG. 6 is a schematic diagram of a basic processing flow of a data transmission method on the MCE side according to one embodiment of the disclosure.

The detailed processing flow of a data transmission method on MCE side according to one embodiment of the disclosure includes, as shown in FIG. 6, the following steps.

Step 301: The MCE transmits a message indicating that the PMCH carrying the MCCH is not present.

The message indicating that the PMCH carrying the MCCH is not present is: an MBMS SCHEDULING INFORMATION message.

That the PMCH carrying the MCCH is not present indicates that the number of PMCHs is N, but N PMCHs do not carry MCCH, and N is an integer greater than or equal to zero.

Step 302: The MCE receives a response message of the message.

Here, the response message of the message is: MBMS SCHEDULING INFORMATION RESPONSE message.

Prior to performing Step 301, the method further includes:

Step 300: the MCE transmits an M2 SET UP REQUEST message and receives the M2 SET UP RESPONSE message; or, MCE transmits an MCE CONFIGURATION UPDATE message and receives the MCE CONFIGURATION UPDATE ACKNOWLEDGE message.

Embodiment 1

Figure 7:
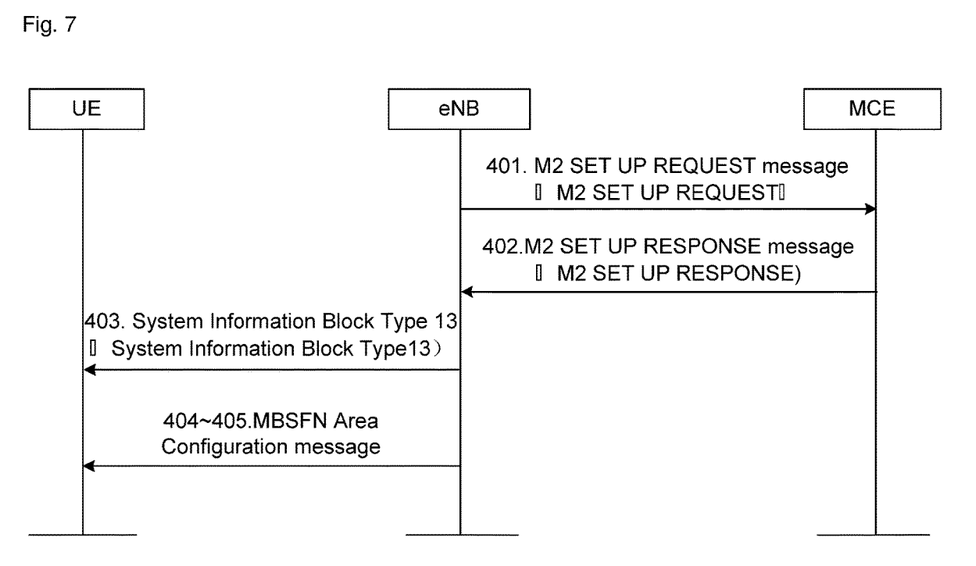
FIG. 7 is a schematic diagram of a detailed processing flow of a data transmission method according to a first embodiment of the disclosure.

The schematic diagram of the detailed process flow of a data transmission method according to a first embodiment of the disclosure includes, as shown in FIG. 7, the following steps.

Step 401: The eNB transmits an M2 SET UP REQUEST message to the MCE.

Step 402: The MCE replies the M2 SET UP RESPONSE message to the eNB.

Here, if the eNB does not receive the MBMS scheduling information indication message, it is confirmed that the PMCH carrying the MCCH is not present.

That the PMCH carrying the MCCH is not present indicates that the number of PMCHs is N, but N PMCHs do not carry MCCH, and N is an integer greater than or equal to zero.

Step 403: The eNB transmits a System Information Block Type 13 message to the UE.

Specifically, the eNB transmits a System Information Block Type 13 message to the UE via the air interface.

The content of the System Information Block Type 13 message is configured according to the M2 SET UP RESPONSE message.

According to the 3GPP TS36331 protocol specification, the UE will read the MCCH in each modification period of MCCH. To save the UE power consumption, the modification period of the MCCH in the System Information Block Type 13 message is set as the maximum value allowed by the protocol on the eNB side. The MCE transmits, to the eNB, MCE CONFIGURATION UPDATE message for eNB to update MCCH modification period as the maximum value allowed by the protocol.

Step 404: The eNB configures the MBSFN Area Configuration message according to the System Information Block message.

Here, the common subframe configuration information of the MBSFN area in the MBSFN Area Configuration message is set as follows, for example: commonSF-Alloc, and commonSF-AllocPeriod are the same as the System Information Block Type 13; the number of PMCHs in the MBSFN Area Configuration message is N+1. The configuration of the added PMCH is the same as the System Information Block Type 13, and the added PMCH contains zero MBMS session.

According to the 3GPP TS36331 protocol specification, the scheduling period of the PMCH carrying the MCCH in the MBSFN Area Configuration message cannot be greater than the MCCH repetition period indicated in the System Information Block Type 13. Therefore, in order to ensure that the message contents transmitted by the eNBs served by a same MCE are consistent, the scheduling period of the PMCH is set to the minimum value allowed by the protocol or the scheduling period of the PMCH is set to the same value as the MCCH repetition period indicated in the System Information Block Type 13 message. Thus, the scheduling resources on the eNB side can be saved to the greatest extent.

Step 405: The eNB performs data scheduling according to the configuration of the System Information Block Type 13 message or the MBSFN Area Configuration message, and transmits the MBSFN Area Configuration message.

Specifically, the eNB transmits the MBSFN Area Configuration message to the UE via an air interface.

Embodiment 2

Figure 8:
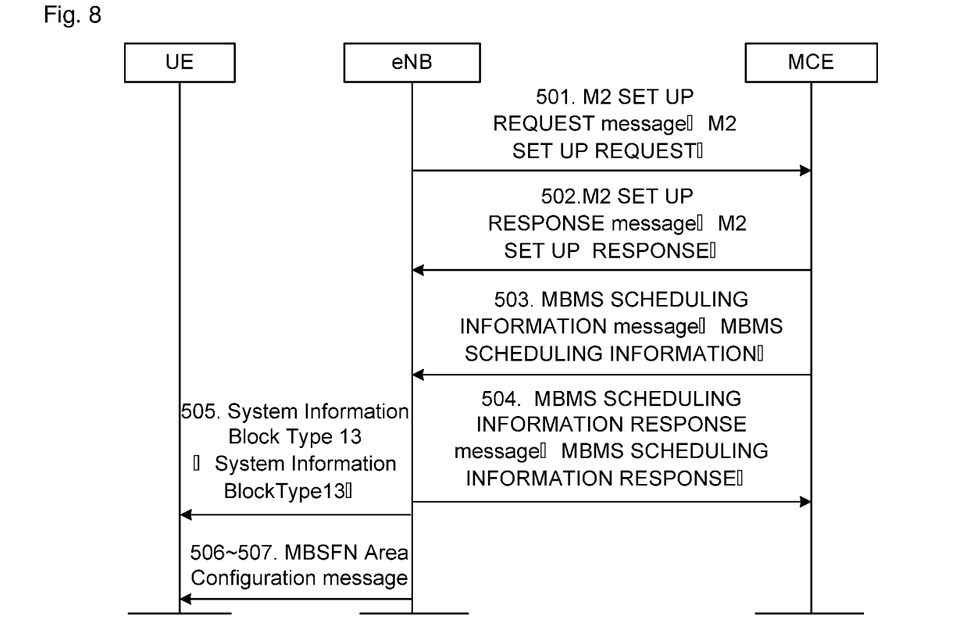
FIG. 8 is a schematic diagram of a detailed processing flow of a data transmission method according to a second embodiment of the disclosure.

The schematic diagram of the detailed process flow of a data transmission method according to a second embodiment of the disclosure includes, as shown in FIG. 8, the following steps.

Step 501: The eNB transmits an M2 SET UP REQUEST message to the MCE.

Step 502: The MCE transmits an M2 SET UP RESPONSE message to the eNB.

Step 503: The MCE transmits an MBMS SCHEDULING INFORMATION message to the eNB.

Here, the MBMS SCHEDULING INFORMATION message indicates that the PMCH carrying the MCCH is not present.

Here, that the PMCH carrying the MCCH is not present indicates that the number of PMCHs is zero.

Step 504: The eNB transmits an MBMS SCHEDULING INFORMATION RESPONSE message to the MCE.

Here, the eNB confirms that the PMCH carrying the MCCH is not present.

Step 505: The eNB transmits a System Information Block Type 13 message to the UE.

Specifically, the eNB transmits a System Information Block Type 13 message to the UE via the air interface.

The content of the System Information Block Type 13 message is configured according to the M2 SET UP RESPONSE message.

According to the 3GPP TS36331 protocol specification, the UE will read the MCCH in each modification period of MCCH. To save the UE power consumption, the modification period of the MCCH in the System Information Block Type 13 message is set as the maximum value allowed by the protocol on the eNB side. The MCE transmits, to the eNB, MCE CONFIGURATION UPDATE message for eNB to update MCCH modification period as the maximum value allowed by the protocol.

Step 506: The eNB configures the MBSFN Area Configuration message according to the System Information Block message.

Here, the common subframe configuration information of the MBSFN area in the MBSFN Area Configuration message is set as follows, for example: commonSF-Alloc, and commonSF-AllocPeriod are the same as the System Information Block Type 13. The number of PMCHs in the MBSFN Area Configuration message is 1. The configuration of the PMCH is the same as the System Information Block Type 13, and the PMCH contains zero MBMS session.

According to the 3GPP TS36331 protocol specification, the scheduling period of the PMCH carrying the MCCH in the MBSFN Area Configuration message cannot be greater than the MCCH repetition period indicated in the System Information Block Type 13. Therefore, in order to ensure that the message contents transmitted by the eNBs served by a same MCE are consistent, the scheduling period of the PMCH is set to the minimum value allowed by the protocol or the scheduling period of the PMCH is set to the same value as the MCCH repetition period indicated in the System Information Block Type 13 message. Thus, the scheduling resources on the eNB side can be saved to the greatest extent.

Step 507: The eNB performs data scheduling according to the configuration of the System Information Block Type13 message or the MBSFN Area Configuration message, and transmits the MBSFN Area Configuration message.

Specifically, the eNB transmits the MBSFN Area Configuration message to the UE via an air interface.

Embodiment 3

Figure 9:
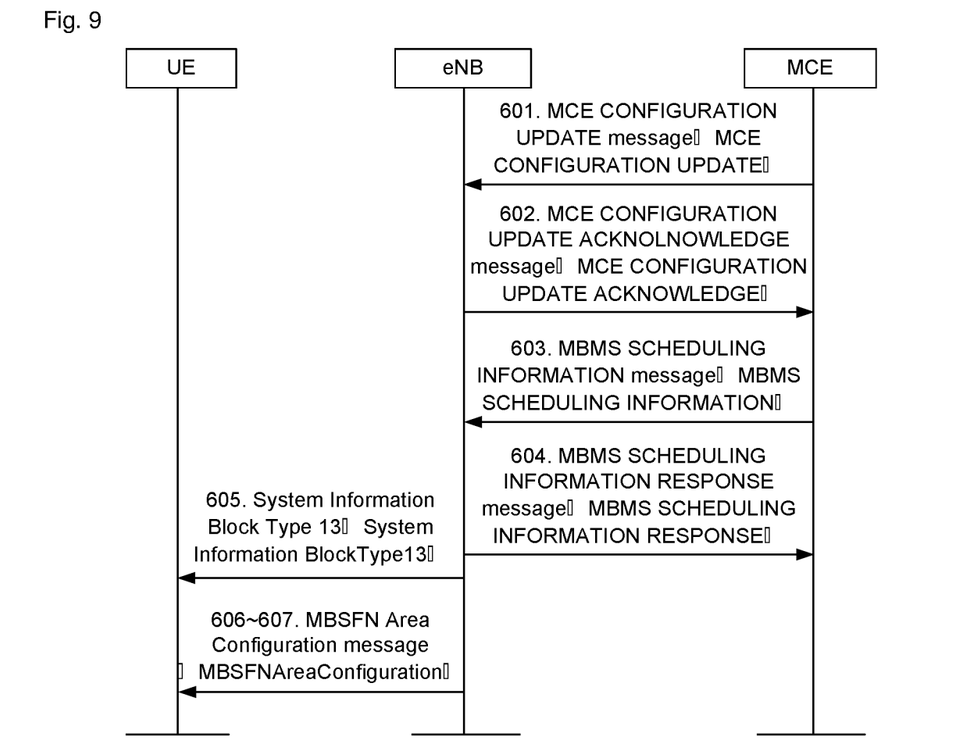
FIG. 9 is a schematic diagram of a detailed processing flow of a data transmission method according to a third embodiment of the disclosure.

The schematic diagram of the detailed process flow of a data transmission method according to a third embodiment of the disclosure includes, as shown in FIG. 9, the following steps.

Step 601: The MCE transmits an MCE CONFIGURATION UPDATE message to the eNB.

Step 602: The eNB transmits an MCE CONFIGURATION UPDATE ACKNOWLEDGE message to the MCE.

Step 603: The MCE transmits an MBMS SCHEDULING INFORMATION message to the eNB.

Here, the MBMS SCHEDULING INFORMATION message indicates that the number of PMCHs is N, where N is a positive integer, but none of the N PMCHs carries the MCCH.

Step 604: The eNB transmits an MBMS SCHEDULING INFORMATION RESPONSE message to the MCE.

Here, the eNB confirms that the PMCH carrying the MCCH is not present.

Step 605: The eNB transmits a System Information Block Type 13 message to the UE.

Specifically, the eNB transmits a System Information Block Type 13 message to the UE via the air interface.

The content of the System Information Block Type 13 message is configured according to the MCE CONFIGURATION UPDATE message.

Step 606: The eNB configures the MBSFN Area Configuration message according to the System Information Block Type 13 message.

Here, the number of PMCHs in the MBSFN Area Configuration message is N+1, and the configuration of the added PMCH is the same as the System Information Block Type 13. The added PMCH contains zero MBMS session.

According to the 3GPP TS36331 protocol specification, the scheduling period of the PMCH carrying the MCCH in the MBSFN Area Configuration message cannot be greater than the MCCH repetition period indicated in the System Information Block Type 13. Therefore, in order to ensure that the message contents transmitted by the eNBs served by a same MCE are consistent, the scheduling period of the PMCH is set to the minimum value allowed by the protocol or the scheduling period of the PMCH is set to the same value as the MCCH repetition period indicated in the System Information Block Type 13 message. Thus, the scheduling resources on the eNB side can be saved to the greatest extent.

Step 607: The eNB performs data scheduling according to the configuration of the System Information Block Type13 message or the MBSFN Area Configuration message, and transmits the MBSFN Area Configuration message.

Specifically, the eNB transmits the MBSFN Area Configuration message to the UE via an air interface.

Embodiment 4

Figure 10:
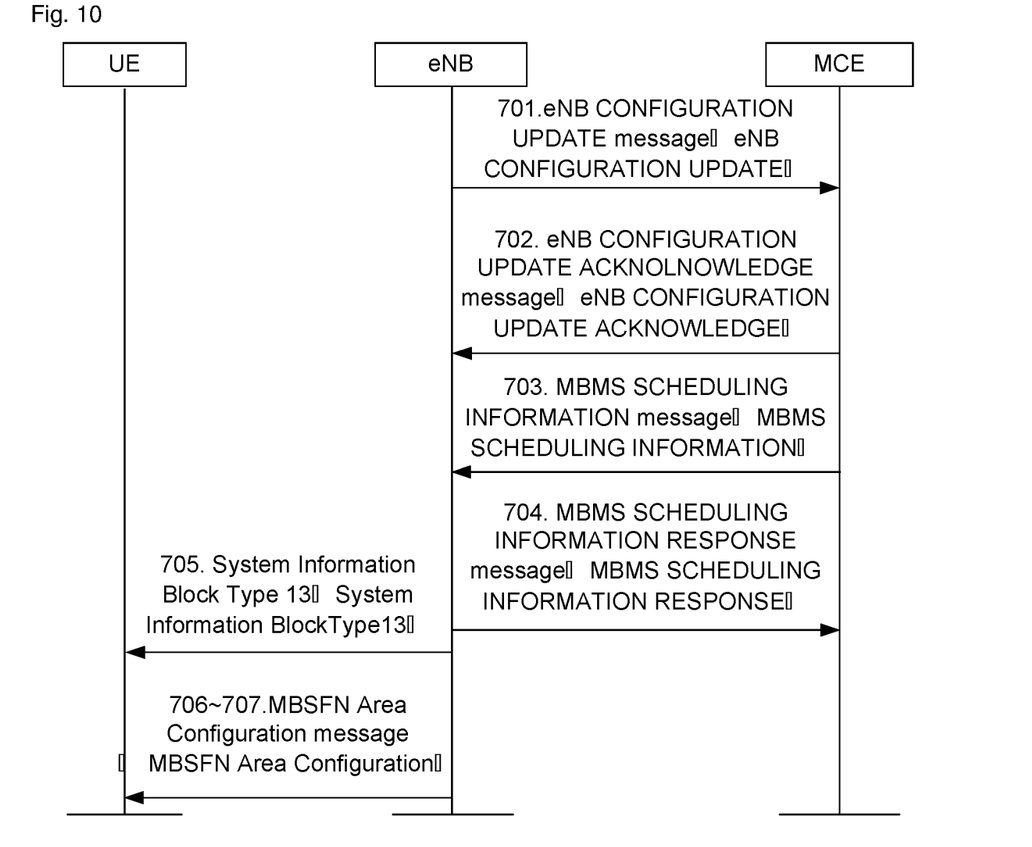
FIG. 10 is a schematic diagram of a detailed processing flow of a data transmission method according to a fourth embodiment of the disclosure.

The schematic diagram of the detailed process flow of a data transmission method according to a fourth embodiment of the disclosure includes, as shown in FIG. 10, the following steps.

Step 701: The eNB transmits an eNB CONFIGURATION UPDATE message to the MCE.

Step 702: The MCE transmits an eNB CONFIGURATION UPDATE ACKNOWLEDGE message to the eNB.

Step 703: The MCE transmits an MBMS SCHEDULING INFORMATION message to the eNB.

Here, the MBMS SCHEDULING INFORMATION message indicates that the number of PMCHs is N, where N is a positive integer, but none of the N PMCHs carries the MCCH.

Step 704: The eNB transmits an MBMS SCHEDULING INFORMATION RESPONSE message to the MCE.

Here, the eNB confirms that the PMCH carrying the MCCH is not present.

Step 705: The eNB transmits a System Information Block Type 13 message to the UE.

Specifically, the eNB transmits a System Information Block Type 13 message to the UE via the air interface.

The content of the System Information Block Type 13 message is configured according to the eNB CONFIGURATION UPDATE ACKNOWLEDGE message.

Step 706: The eNB configures the MBSFN Area Configuration message according to the System Information Block Type 13 message.

Here, the common subframe configuration information of the MBSFN area in the MBSFN Area Configuration message is set as follows, for example: commonSF-Alloc, and commonSF-AllocPeriod are the same as the System Information Block Type 13. The number of PMCHs in the MBSFN Area Configuration message is N+1. The configuration of the added PMCH is the same as the System Information Block Type 13, and the added PMCH contains zero MBMS session.

According to the 3GPP TS36331 protocol specification, the scheduling period of the PMCH carrying the MCCH in the MBSFN Area Configuration message cannot be greater than the MCCH repetition period indicated in the System Information Block Type 13. Therefore, in order to ensure that the message contents transmitted by the eNBs served by a same MCE are consistent, the scheduling period of the PMCH is set to the minimum value allowed by the protocol or the scheduling period of the PMCH is set to the same value as the MCCH repetition period indicated in the System Information Block Type 13 message. Thus, the scheduling resources on the eNB side can be saved to the greatest extent.

Step 707: The eNB performs data scheduling according to the configuration of the System Information Block Type13 message or the MBSFN Area Configuration message, and transmits the MBSFN Area Configuration message.

Specifically, the eNB transmits the MBSFN Area Configuration message to the UE via an air interface.

Figure 11:
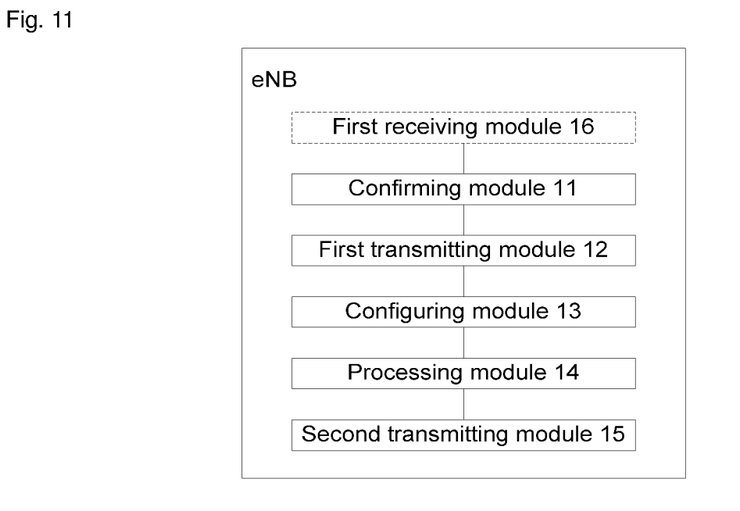
FIG. 11 is a schematic diagram of the composition structure of an eNB according to an embodiment of the disclosure.

In order to realize the above data transmission method, an embodiment of the disclosure also provides an eNB. The schematic diagram of the composition structure of the eNB includes, as shown in FIG. 11, a confirming module 11, a first transmitting module 12, a configuring module 13, a processing module 14, and a second transmitting module 15.

In particular, the confirming module 11 is configured to confirm whether a PMCH carrying the MCCH is present;

the first transmitting module 12 is configured to transmit a System Information Block message when the confirming module confirms that the PMCH carrying the MCCH is not present;

the configuring module 13 is configured to configure an MBSFN Area Configuration message according to the System Information Block message;

the processing module 14 is configured to perform data scheduling according to the configuration of the System Information Block message or a configuration of an MBSFN Area Configuration message; and the second transmitting module 15 is configured to transmit the MBSFN Area Configuration message.

In an embodiment, the eNB further includes: a first receiving module 16, which confirms that the PMCH carrying the MCCH is not present, the first receiving module 16 is configured to receive an M2 SETUP RESPONSE message; or the first receiving module 16 is further configured to receive an MBMS SCHEDULING INFORMATION message indicating that the PMCH carrying the MCCH is not present.

In an embodiment, the first receiving module 16 is further configured to receive an MCE configuration update message.

Correspondingly, the first transmitting module 12 is specifically configured to transmit a SYSTEM INFORMATION BLOCK message through an air interface. The content of the SYSTEM INFORMATION BLOCK message is configured according to the M2 SETUP RESPONSE message when the M2 SETUP RESPONSE message indicates that the PMCH carrying the MCCH is not present.

The content of the system information block message is configured according to one of the MBMS SCHEDULING INFORMATION RESPONSE message, the eNB CONFIGURATION UPDATE ACKNOWLEDGE message, and the MCE CONFIGURATION UPDATE message, the message time of which is newer, when the MBMS SCHEDULING INFORMATION message indicates that the PMCH carrying the MCCH is not present.

In one embodiment, according to the 3GPP TS36331 protocol specification, the UE will read the MCCH in each modification period of MCCH. To save the UE power consumption, the modification period of the MCCH in the System Information Block Type13 message is set as the maximum value allowed by the protocol on the eNB side. The MCE transmits, to the eNB, MCE CONFIGURATION UPDATE message for eNB to update MCCH modification period as the maximum value allowed by the protocol.

According to the 3GPP TS36331 protocol specification, the scheduling period of the PMCH carrying the MCCH in the MBSFN Area Configuration message cannot be greater than the MCCH repetition period indicated in the System Information Block. Therefore, in order to ensure that the message contents transmitted by the eNBs served by a same MCE are consistent, the scheduling period of the PMCH is set to the minimum value allowed by the protocol or the scheduling period of the PMCH is set to the same value as the MCCH repetition period indicated in the System Information Block message. Thus, the scheduling resources on the eNB side can be saved to the greatest extent.

Figure 12:
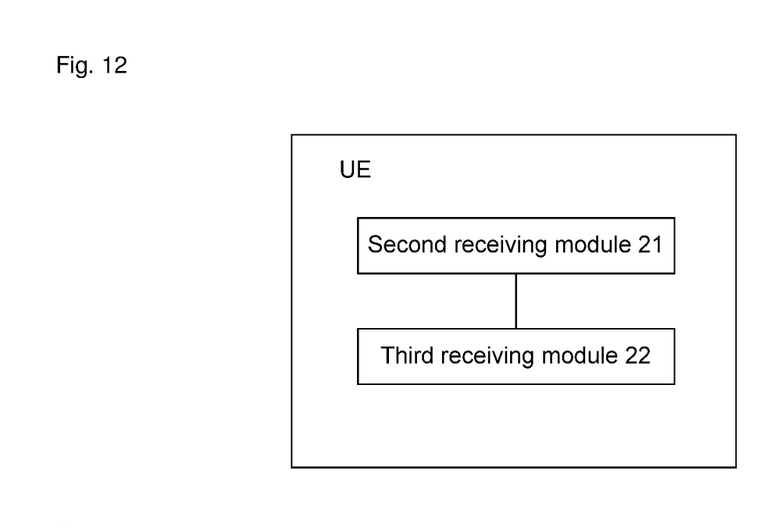
FIG. 12 is a schematic diagram of the composition structure of a UE according to an embodiment of the disclosure.

In order to realize the above data transmission method, an embodiment of the disclosure also provides a UE. The schematic diagram of the composition structure of the UE includes, as shown in FIG. 12, a second receiving module 21 and a third receiving module 22.

In particular, the second receiving module 21 is configured to receive a System Information Block message;

the third receiving module 22 is configured to receive an MBSFN Area Configuration message; and the content of the MBSFN Area Configuration message is configured by the UE according to the system information block message indicating that the number of PMCHs is N+1. One PMCH carries an MCCH, and the PMCH carrying the MCCH contains zero MBMS session.

In one embodiment, the UE receives a System Information Block message and an MBSFN Area Configuration message transmitted by the eNB through an air interface.

The content of the System Information Block message is configured according to one of the M2 SETUP RESPONSE message, the eNB CONFIGURATION UPDATE ACKNOWLEDGE message and the MEC CONFIGURATION UPDATE message, the message time of which is newer. The modification period of the MCCH in the System Information Block message is the maximum value allowed by the 3GPP TS36331 protocol.

The common subframe configuration information of the MBSFN area in the MBSFN Area Configuration message is set as follows, for example: commonSF-Alloc, and commonSF-AllocPeriod are the same as the System Information Block. The number of PMCHs in the MBSFN Area Configuration message is N+1. The configuration of the added PMCH is the same as the System Information Block message, and the added PMCH contains zero MBMS session. The scheduling period of the PMCH in the MBSFN Area Configuration message is the minimum value allowed by the 3GPP TS36331 protocol or the scheduling period of the PMCH is the same value as the MCCH repetition period indicated in the System Information Block Type 13 message.

Figure 13:
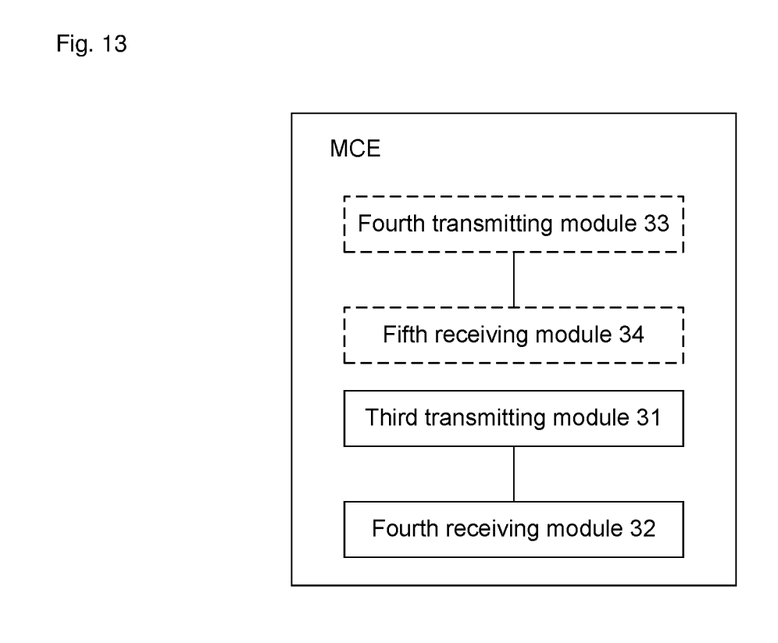
FIG. 13 is a schematic diagram of the composition structure of a MCE according to an embodiment of the disclosure.

In order to realize the above data transmission method, an embodiment of the disclosure also provides a MCE. The schematic diagram of the composition structure of the MCE includes, as shown in FIG. 13, a third transmitting module 31, a fourth receiving module 32, a fourth transmitting module 33, and a fifth receiving module 34.

In particular, the third transmitting module 31 is configured to transmit a message indicating that the PMCH carrying the MCCH is not present;

the fourth receiving module 32 is configured to receive a response message of the message;

the fourth transmitting module 33 is configured to transmit an M2 SET UP RESPONSE message;

the fifth receiving module 34 is configured to receive an M2 SET UP REQUEST message; or the fourth transmitting module 33 is configured to transmit an eNB CONFIGURATION UPDATE ACKNOWLEDGE message;

the fifth receiving module 34 is configured to receive an eNB CONFIGURATION UPDATE message; or the fourth transmitting module 33 is configured to transmit an MCE CONFIGURATION UPDATE message; and the fifth receiving module 34 is configured to receive an MCE CONFIGURATION UPDATE ACKNOWLEDGE message.

In one embodiment, the response message of the message is: MBMS SCHEDULING INFORMATION RESPONSE message.

The confirming module 11, the first transmitting module 12, the configuring module 13, the processing module 14, the second transmitting module 15, and the first receiving module 16 in eNB, the second receiving module 21 and the third receiving module 22 in the UE, and the third transmitting module 31, the fourth receiving module 32, the fourth transmitting module 33, and the fifth receiving module 34 in the MCE proposed in the embodiment of the disclosure may all be realized by a processor, and may be realized by a specific logic circuit of course. The processor may be a processor on a mobile terminal or server, and in practical applications, the processor may be a Central Processing Unit (CPU), a Microprocessor (MPU), a Digital Signal Processor (DSP), or a FIELD PROGRAMMABLE GATE ARRAY (FPGA) and so on.

In the embodiment of the disclosure, if the above data transmission method is implemented in the form of a software function module and is sold or used as a standalone product, it may be stored in a computer-readable storage medium. Based on this understanding, the technical solution of the embodiment of the disclosure, in essence or for the part making a contribution to the traditional art, may be embodied in the form of a software product stored in a storage medium. The storage medium includes a number of instructions so that a computer device (which may be a personal computer, a server, or a network device, etc.) performs all or part of the method described in the various embodiments of the disclosure. However, the aforementioned storage medium includes a variety of media such as a USB disk, a mobile hard disk, a Read Only Memory (ROM), a magnetic disk, or an optical disk, in which a program code can be stored. Thus, embodiments of the disclosure are not limited to any particular combination of hardware and software.

Accordingly, an embodiment of the disclosure further provides a computer storage medium in which a computer program is stored. The program is used for executing the above data transmission method in the embodiment of the disclosure.

The foregoing is merely preferred embodiments of the disclosure and is not intended to limit the scope of protection of the disclosure.

What is claimed is:

1. A method for data transmission, the method comprising:
    transmitting, by an eNB, a system information block message upon confirming that a Physical Multicast Channel (PMCH) carrying a Multicast Control Channel (MCCH) is not present;
    configuring a Multimedia Broadcast Multicast Service Single Frequency Network (MBSFN) area configuration message according to the system information block message;
    performing data scheduling according to a configuration of the system information block message or a configuration of the MBSFN area configuration message; and
    transmitting the MBSFN area configuration message;
    wherein, a content of the system information block message is configured according to one of an M2 setup request response message, an eNB configuration update acknowledge message, and an MCE configuration update message, a message time of which is newer.

2. The method according to claim 1, wherein confirming that the PMCH carrying the MCCH is not present comprises:
    receiving, by the eNB, the M2 setup request response message, and confirming that the PMCH carrying the MCCH is not present when the MBMS scheduling information indication message is not received; or
    receiving, by the eNB, an MBMS scheduling information indication message, and confirming that the PMCH carrying the MCCH is not present according to the MBMS scheduling information indication message; and wherein that the PMCH carrying the MCCH is not present indicates that the number of PMCHs carrying the MCCH is 0, or the number of PMCHs is N but N PMCHs do not carry the MCCH, and N is a integer greater than or equal to 1.

3. The data transmission method according to claim 2, wherein before transmitting the system information block message, the method further comprises: receiving, by the eNB, a Multi-Cell/Multicast Coordination Entity (MCE) configuration update message; and transmitting the system information block message comprises: transmitting the system information block message through an air interface.

4. A nontransitory computer storage medium, in which computer-executable instructions are stored, wherein when the computer-executable instructions are executed by a processor, the processor implements the method for data transmission according to claim 1.

5. A method for data transmission, the method comprising:

receiving, by user equipment (UE), a system information block message and an MBSFN area configuration message;

wherein a content of the MBSFN area configuration message is configured by an eNB according to the system information block message, and the MBSFN area configuration message indicates that the number of Physical Multicast Channels (PMCHs) is N+1, wherein N is an integer equal to or greater than 0, a PMCH carries a Multicast Control Channel (MCCH), and the number of MBMS sessions contained in the PMCH carrying the MCCH is zero;

a content of the system information block message is configured according to one of an M2 setup request response message, an eNB configuration update acknowledge message, and an MCE configuration update message, a message time of which is newer.

6. A nontransitory computer storage medium, in which computer-executable instructions are stored, wherein when the computer-executable instructions are executed by a processor, the processor implements the method for data transmission according to claim 5.

7. A method for data transmission, the method comprising:

transmitting, by a Multi-Cell/Multicast Coordination Entity (MCE), a message indicating that a PMCH carrying a MCCH is not present to an eNB; and receiving, by the MCE, a response message of the message when the eNB confirms that the PMCH carrying the MCCH is not present, and prior to the step of transmitting, by the MCE, the message indicating that the PMCH carrying the MCCH is not present, the method further comprises: transmitting, by the MCE, an M2 setup request response message, an eNB configuration update acknowledge message and an MCE configuration update message to the eNB, wherein the eNB configures a system information block message according to one of the M2 setup request response message, the eNB configuration update acknowledge message, and the MCE configuration update message, the message time of which is newer.

8. The method according to claim 7, wherein the message indicating that the PMCH carrying the MCCH is not present is: the MBMS scheduling information indication message; and the response message of the message is: the MBMS scheduling information indication response message.

9. The method according to claim 7, wherein before the MCE transmits message indicating that the PMCH carrying the MCCH is not present, the method further comprises:

receiving, by the MCE, an M2 setup request message; or receiving, by the MCE, an eNB configuration update message; or receiving, by the MCE, an MCE configuration update acknowledge message.

10. A nontransitory computer storage medium, in which computer-executable instructions are stored, wherein when the computer-executable instructions are executed by a processor, the processor implements the method for data transmission according to claim 7.

11. A base station, the base station comprising: a first confirming device, a first transmitting device, a configuring device, a processing device and a second transmitting device; wherein the first confirming device is configured to confirm whether a PMCH carrying an MCCH is present;

the first transmitting device is configured to transmit a system information block message when the first confirming device confirms that the PMCH carrying the MCCH is not present;

the configuring device is configured to configure an MBSFN area configuration message according to the system information block message;

the processing device is configured to perform data scheduling according to a configuration of the system information block message or a configuration of the MBSFN area configuration message; and the second transmitting device is configured to transmit the MBSFN area configuration message;

wherein a content of the system information block message is configured according to one of an M2 setup request response message, an eNB configuration update acknowledge message, and an MCE configuration update message, a message time of which is newer.

12. The base station according to claim 11, wherein the base station further comprises a first receiving device, wherein when the confirming device confirms that the PMCH carrying the MCCH is not present, the first receiving device is configured to receive the M2 setup request response message; or the first receiving device is further configured to receive an MBMS scheduling information indication message indicating that the PMCH carrying the MCCH is not present;

wherein that the PMCH carrying the MCCH is not present indicates that the number of PMCHs carrying the MCCH is 0, or the number of PMCHs is N but N PMCHs do not carry the MCCH, and N is a integer greater than or equal to 1.

13. The base station according to claim 12, wherein the first receiving device is further configured to receive the MCE configuration update message; and the first transmitting device is configured to transmit the system information block message through an air interface.

14. A user equipment (UE), the user equipment comprising: a second receiving device and a third receiving device; wherein the second receiving device is configured to receive a system information block message; and the third receiving device is configured to receive an MBSFN area configuration message; and a content of the MBSFN area configuration message is configured by an eNB according to the system information block message, and the MBSFN area configuration message indicates that the number of Physical Multicast Channels (PMCHs) is N+1, wherein N is an integer equal to or greater than 0, a PMCH carries a Multicast Control Channel (MCCH), and the number of MBMS sessions contained in the PMCH carrying the MCCH is zero;

a content of the system information block message is configured according to one of an M2 setup request response message, an eNB configuration update acknowledge message, and an MCE configuration update message, a message time of which is newer.

15. A multi-cell/multicast coordination entity (MCE), the MCE comprising: a third transmitting device and a fourth receiving device, wherein the third transmitting device is configured to transmit a message indicating that a Physical Multicast Channels (PMCH) carrying a Multicast Control Channel (MCCH) is not present to an eNB; and the fourth receiving device is configured to receive a response message of the message when the eNB confirms that the PMCH carrying the MCCH is not present, wherein the MCE further comprises: a fourth transmitting module, configured to transmit an M2 setup request response message, an eNB configuration update acknowledge message and an MCE configuration update message to the eNB, wherein the eNB configures a system information block message according to one of the M2 setup request response message, the eNB configuration update acknowledge message, and the MCE configuration update message, a message time of which is newer.

16. The MCE according to claim 15, wherein the message indicating that the PMCH carrying the MCCH is not present is: the MBMS scheduling information indication message; and the response message of the message is: the MBMS scheduling information indication response message.

17. The MCE according to claim 15, wherein the MCE further comprises: a fifth receiving device, wherein the fifth receiving device is configured to receive an M2 setup request message; or the fifth receiving device is configured to receive an eNB configuration update message; or the fifth receiving device is configured to receive an MCE configuration update acknowledge message.

* * * * *